United States Patent
Cook

(10) Patent No.: US 7,588,407 B2
(45) Date of Patent: Sep. 15, 2009

(54) TRANSPORT TRAILER AND METHOD

(76) Inventor: Mark Cook, 1577 Jim Fenley Loop, Lufkin, TX (US) 75901

(*) Notice: Subject to any disclaimer, the term of this patent is extended or adjusted under 35 U.S.C. 154(b) by 136 days.

(21) Appl. No.: 11/581,919

(22) Filed: Oct. 17, 2006

(65) Prior Publication Data
US 2008/0101902 A1    May 1, 2008

(51) Int. Cl.
B60B 29/00    (2006.01)
(52) U.S. Cl. .................. 414/426; 414/331.14
(58) Field of Classification Search ............ 414/426, 414/679, 331.04, 331.14
See application file for complete search history.

(56) References Cited

U.S. PATENT DOCUMENTS

| | | | | |
|---|---|---|---|---|
| 3,738,519 A * | 6/1973 | Edwards | ................. | 414/620 |
| 4,770,577 A * | 9/1988 | Farris | ................. | 410/2 |
| 5,027,991 A | 7/1991 | Braddock | | |
| 5,158,066 A * | 10/1992 | Dodgen | ................. | 126/25 R |
| 5,356,163 A | 10/1994 | Suggs, Sr. | | |
| 5,401,137 A * | 3/1995 | Nijenhuis | ................. | 414/679 |
| 5,421,318 A * | 6/1995 | Unruh et al. | ................. | 126/25 A |
| 5,823,558 A | 10/1998 | Shoquist | | |
| 5,915,913 A * | 6/1999 | Greenlaw et al. | ................. | 414/679 |
| 5,927,931 A | 7/1999 | Raben | | |
| 5,931,262 A * | 8/1999 | Greenlaw et al. | ................. | 187/244 |
| 6,157,889 A | 12/2000 | Baker | | |
| 6,296,434 B1 * | 10/2001 | Sato | ................. | 414/223.01 |
| 6,382,644 B1 | 5/2002 | Rawlings | | |
| 6,527,499 B2 | 3/2003 | Leimbach et al. | | |
| 6,736,050 B1 * | 5/2004 | Monn | ................. | 99/339 |
| 6,814,214 B2 | 11/2004 | Warlow et al. | | |
| 6,935,248 B2 * | 8/2005 | Warlow et al. | ................. | 108/55.1 |
| 2003/0226470 A1 | 12/2003 | Dibble et al. | | |

FOREIGN PATENT DOCUMENTS

| | | | | |
|---|---|---|---|---|
| DE | 4442155 A1 | * | 5/1996 | |
| EP | 391357 A1 | * | 10/1990 | |
| GB | 2198104 A | * | 6/1988 | |
| GB | 2273691 A | * | 6/1994 | |
| JP | 05294412 A | * | 11/1993 | |

* cited by examiner

Primary Examiner—Saúl J Rodriguez
Assistant Examiner—Joshua I Rudawitz
(74) Attorney, Agent, or Firm—Browning Bushman P.C.

(57) ABSTRACT

A trailer 10 includes a frame 12 having a central axis 14 spaced between rear wheels. A plurality of storage units 20 are supported on the trailer frame, with each storage unit supporting a plurality of objects thereon. Each storage support has a support axis 22 substantially parallel to the frame central axis. A carriage assembly 24 rotates the plurality of storage supports, and a lift mechanism 30 raises and lowers the carriage assembly.

16 Claims, 3 Drawing Sheets

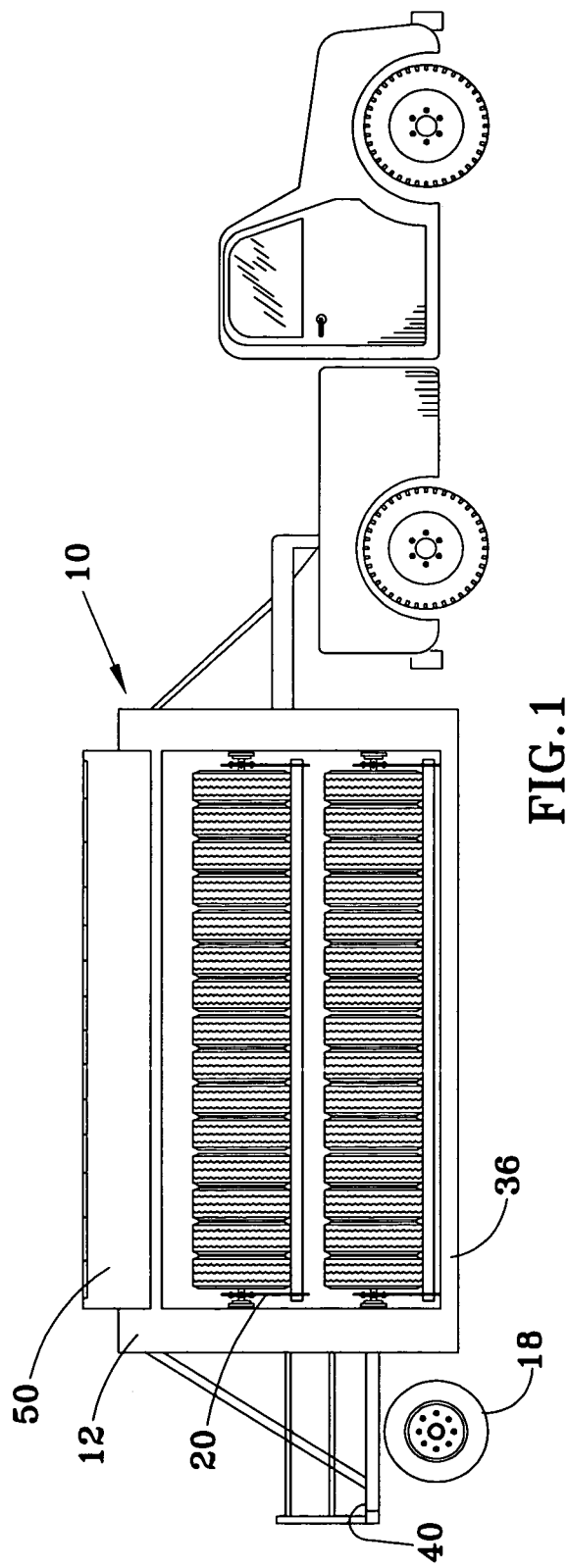
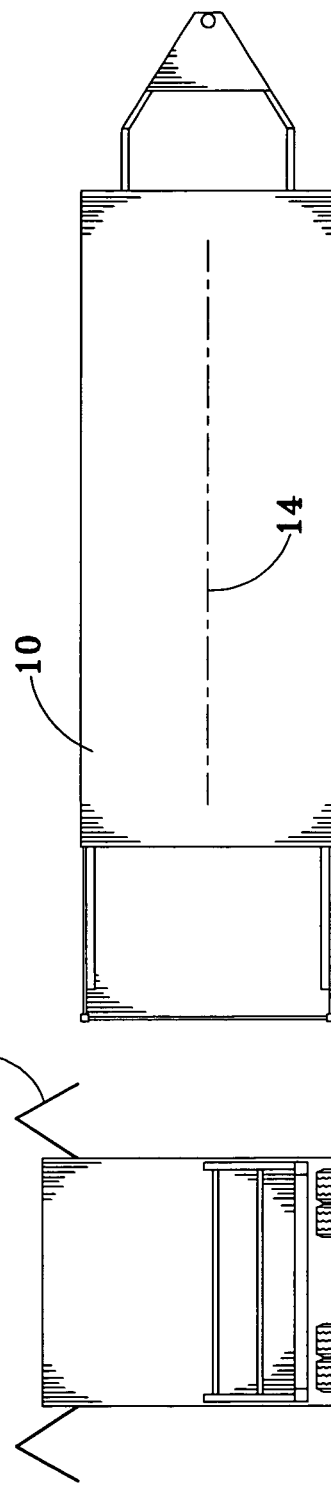

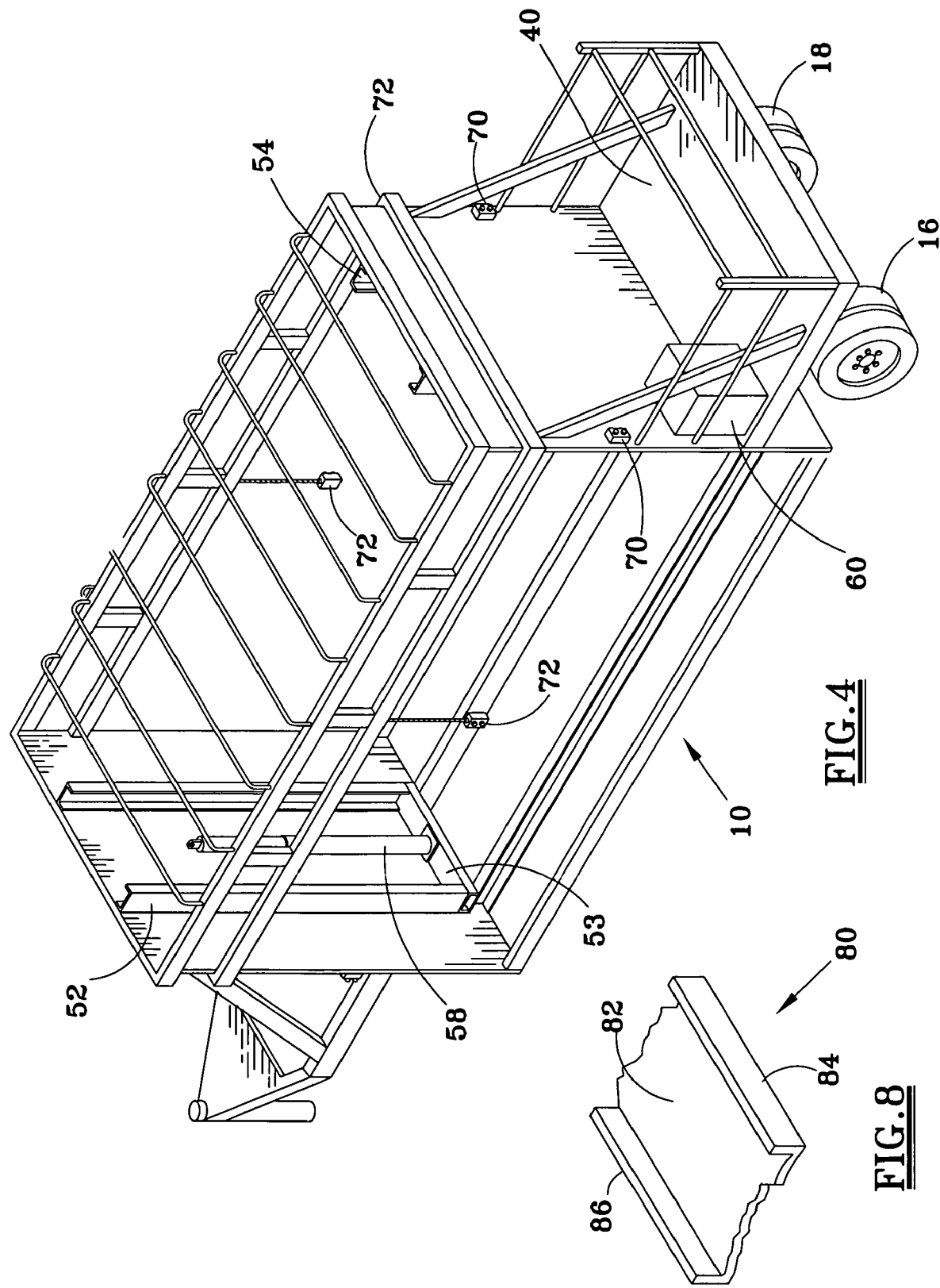

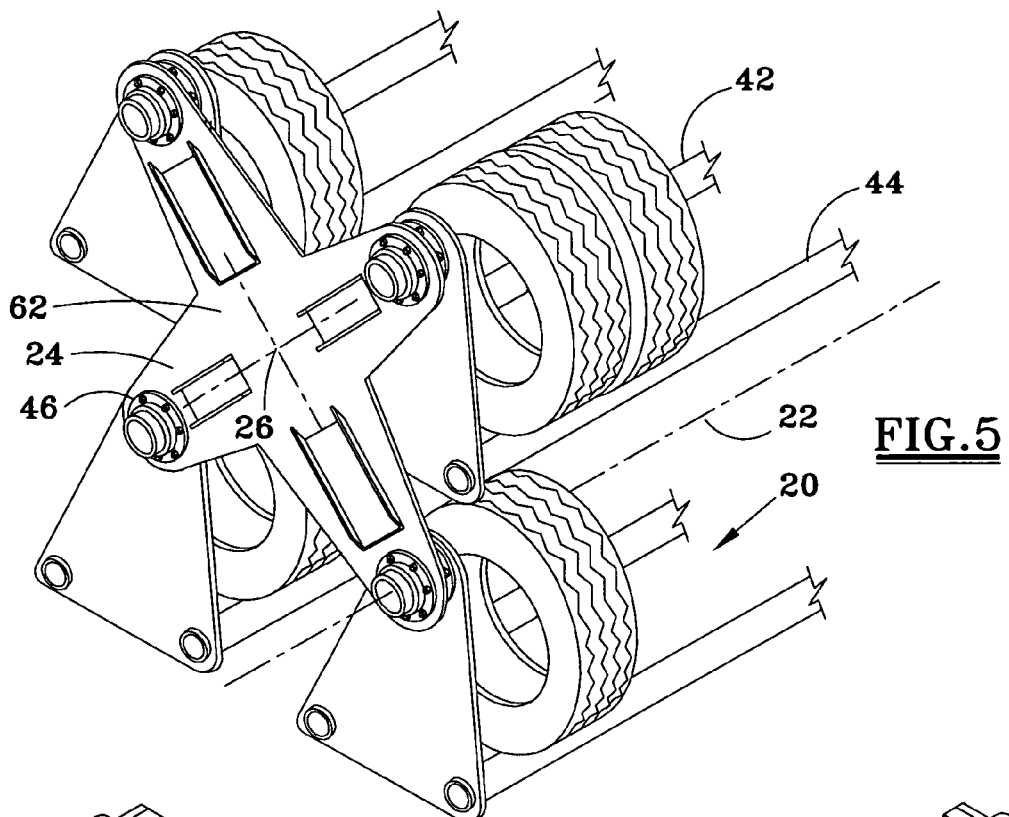
FIG.5
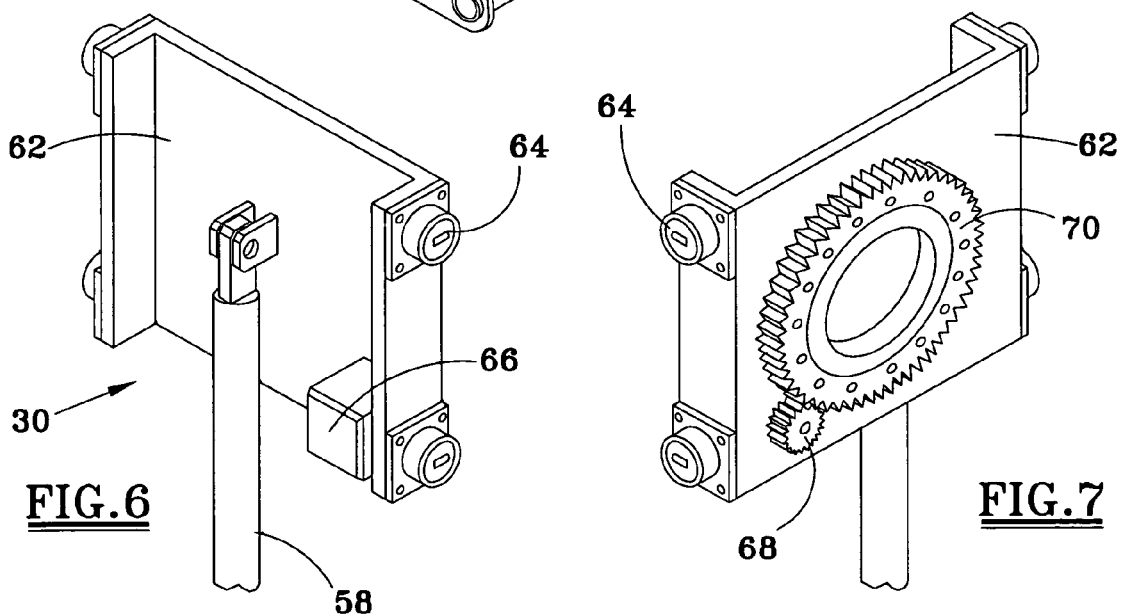
FIG.6
FIG.7

TRANSPORT TRAILER AND METHOD

FIELD OF THE INVENTION

The present invention relates to trailers of the type conventionally used for transporting objects, including trailers removably connected to a powered operator cab. More particularly, this invention relates to an improved trailer for reducing injury to transport personnel. In one embodiment, the trailer may be used to transport tires which are supported on storage racks.

BACKGROUND OF THE INVENTION

Various types of trailers have been devised to transport objects, and trailers have been specifically designed for transporting one type of object. Nevertheless, a considerable time and money are incurred in loading and unloading selected ones of the transported objects at a specific location. Moreover, trailer workers are commonly injured when loading and unloading objects from a trailer, particularly when the objects are heavy and/or bulky.

U.S. Pat. No. 6,814,214 discloses a unitary trailer and powered operator cab. The trailer includes a pallet and conveyor system for loading pallets onto the vehicle, with the pallets movable in an elongate loop with front and rear ends of the loop rotating about an axis parallel to the vehicle's axis.

Various types of patents disclose systems for generally transporting tires. U.S. Pat. No. 5,927,931 discloses a lift for raising and lowering a stack of tires. U.S. Pat. Nos. 5,027,991 and 5,356,163 each disclose structures for transporting a single tire. U.S. Pat. No. 6,382,644 discloses a transport and a tire and wheel assembly. A device referred to as the Tire Butler being promoted by Mobile Concepts, Inc. uses a trailer for transporting tires. Publication 2001/0028838 and U.S. Pat. No. 6,527,499 also disclose equipment for handling and transporting tires.

U.S. Pat. No. 5,823,558 discloses a trailer loading support. A load distribution system for trucks is disclosed in U.S. Pat. No. 6,157,889. Publication 2003/0226470 discloses a rail transport system for bulk materials.

The disadvantages of the prior art are overcome by the present invention, and an improved trailer and method are hereinafter disclosed.

SUMMARY OF THE INVENTION

In one embodiment, a trailer for transporting objects includes a trailer frame having a central axis spaced between left-side and right-side rear wheels, and a plurality of storage units supported on the trailer frame, with each supporting unit for supporting a plurality of objects thereon and having a storage support axis substantially parallel to the trailer frame central axis. A carriage is provided for rotatably supporting the plurality of storage units about a carriage axis substantially parallel with the trailer central axis. The lift mechanism raises and lowers the carriage and thereby the object supported on the storage supports with respect to the trailer frame.

According to one embodiment of the method of the invention, a trailer frame is provided with a central axis spaced between a left-side rear wall and a right-side rear wall. The method includes supporting a plurality of storage to the ports on the trailer axis, with each storage support supporting a plurality of objects thereon, such as tires, and each storage support having a storage support axis substantially parallel to the trailer frame central axis. The method includes rotatably supporting the plurality of storage supports about a carriage axis substantially parallel with the trailer central axis, and raising or lowering the carriage and thereby the objects supported on the storage supports with respect to the trailer frame.

These and further features and advantages of the present invention will become apparent from the following detailed description, wherein reference is made to the figures in the accompanying drawings.

BRIEF DESCRIPTION OF THE DRAWINGS

FIG. 1 is a side view of a suitable trailer and powered operator cab with the side doors raised.

FIG. 2 is a rear view of the trailer shown in FIG. 1, with the side doors raised.

FIG. 3 is a top view of the trailer shown in FIG. 1, with the side doors closed and the operator cab removed.

FIG. 4 is a pictorial view of a portion of the trailer shown in FIG. 1.

FIG. 5 illustrates a portion of the carriage assembly.

FIG. 6 illustrates an upper end of a lifting cylinder and a lifting plate for raising and lowering the carriage assembly.

FIG. 7 illustrates another view of a rotatable lifting cylinder and lifting plate.

FIG. 8 illustrates a portion of a suitable tray supported on the carriage assembly for holding boxes or other goods.

DETAILED DESCRIPTION OF PREFERRED EMBODIMENTS

FIG. 1 discloses one embodiment of a trailer 10 for transporting tires. For the depicted embodiment, a pickup truck or other powered operator cab may be used to transport the trailer, or the trailer may be integral with the powered transport cab.

The trailer includes a trailer frame 12 having a central axis 14 which, as shown in FIG. 3 is spaced between a left-side rear wheel 16 and a right-side rear wheel 18. As disclosed further below, the trailer frame supports a plurality of storage units 20, which for the embodiment depicted in FIG. 1, is a plurality of tires. Each storage unit has a storage support axis 22 which is substantially parallel to the trailer central axis 14. A portion of the carriage assembly 24 is shown in FIG. 5, and rotatably supports the plurality of tires about a carriage axis substantially parallel with the trailer central axis. A lift mechanism 30 as shown in FIG. 6 is provided for raising and lowering the carriage and thereby the objects supported on the storage units with respect to the trailer frame.

For the embodiment as shown in FIG. 1, the entirety of the carriage and the plurality of storage units are forward of the rear wheels of the trailer. A storage deck 40 is provided above the rear wheels for storing miscellaneous objects. As explained further below, the carriage assembly may be raised and lowered, so that when loading or unloading objects, the objects are desirably relatively close to the ground. As shown in FIG. 1, the low position of the tires relative to the ground is achieved by providing a lower portion 36 of the trailer frame which is vertically below the centerline of the wheels 16, 18. In a preferred embodiment, the trailer frame supports moveable side panels 50, which may be lowered to be flush with the exterior of the frame during transport, as shown in FIG. 3, but may be raised as shown in FIGS. 1 and 2 when the trailer is parked to allow for full viewing of the carriage operation.

FIG. 4 shows in further detail suitable components of the trailer 10. The frame 12 includes a pair of spaced apart front guides 52, with each guide suitably formed by a C-channel. A similar pair of rear guides 54 are also shown. These guides allow for the selective raising and lowering of the carriage by a pair of powered fluid cylinders 58. A lower portion of cylinder 58 is shown in FIG. 4 between the pair of front guides 52 and resting on a frame guide base 53. FIG. 4 also illustrates a suitable rear deck 40 for storage of miscellaneous components, including a power unit 60 for powering operation of the carriage assembly.

FIG. 5 illustrates a portion of the carriage assembly 24 which, for the depicted embodiment, includes 4 storage units each having a central axis 22 so that the storage unit may rotate as a subassembly about pivot 46 with respect to rotatable carriage end plate 62. For handling tires, the storage unit may include rods or other elongate supports 42, 44 as shown in FIG. 5, each extending between the spaced apart end plates 62 of the carriage assembly.

The carriage assembly 24 may be raised or lowered by a lift mechanism 30 including a pair of powered cylinders 58 and a guide plate 62 at the upper end of each cylinder. The moveable plate 62 includes a plurality of rollers or other suitable guides 64, which are guided by the front and rear supports for raising and lowering the carriage assembly.

FIG. 6 also discloses a suitable drive unit 66, which may rotate gear 68 as shown in FIG. 7, thereby driving gear 70. Gear 70 may then be secured to a respective end plate 60, so that operation of motor 66 controllably rotates the carousel assembly about its central axis 26. A similar drive assembly is provided at the other end of the carriage assembly for simultaneously raising or lowering the other end of the carousel.

Various controls 70, 72 may be provided at desired locations on the trailer, including the sides of the trailer where objects are loaded and unloaded onto and from the storage units, and at the rear of the trailer near the power unit 60. These controls may be regulated by an operator to slowly raise the carousel, thereby allowing activation of the motor 66 to rotate the carousel so that the desired storage rack with the objects to be unloaded and loaded may be positioned on the desired side of the trailer and close to the ground. These controls 70, 72, if desired, may rotate the carousel in either a clockwise or a counterclockwise direction. Safety circuits may be used to ensure that the carousel is not rotated until raised to a sufficient level so that the carousel can rotate without hitting the lower frame of the trailer.

The storage supports as disclosed herein comprise a plurality of racks which are free to rotate with respect to the carriage end plates. In most applications, three or more racks may be equally spaced circumferentially about the carriage. A significant feature of the carriage assembly is that it allows the operator to load or unload goods from either side of the trailer. In some applications, the right-side of the trailer may be blocked, yet the operator may easily and safety unload goods from the left-side of the trailer. At the next delivery spot, the operator has the flexibility of unloading from the left-side of the trailer when the right-side of the trailer is blocked.

Depending on the goods being transported, the rotatable carriage assembly may benefit significantly from a lift mechanism, as disclosed herein. In other applications, and particularly those wherein the goods are relatively light, such as goods transported in the snack food industry, a lift mechanism for raising and lowering the carriage may not be necessary.

The trailer as disclosed herein may be used for transporting various objects other than tires. Bottles of water may be transported in a similar manner to tires, and oils or other liquids may be transported in drums or boxes. A conventional shelf or tray rather than space rods may be used to support a plurality of boxes between the end plates, and such a support tray would be suitable for transporting vehicular batteries, package delivery boxes, and various products distributed to retail food stores, including produce, dairy products, cookies/crackers, bread, and potato chips. A tray 80 as shown in FIG. 8 may extend between the end plates 62 replacing the purpose of the rods 42, 44. The tray 86 preferably having a base or floor 82, and sides 84, 86. The tray 86 may be suitably supported to hold to the weight of the goods between the end plates 62.

The term "trailer" as used herein refers to a trailer removably connected to a powered operator cab, whether termed a tractor, a truck, or a cab, and includes fifth wheel trailers and gooseneck trailers. A "trailer" also includes the trailer portion of cab/trailer combinations, whether detachable from the cab or integral with the cab. A conventional utility truck for delivery of parcels or bread is thus considered to include a trailer which is fixed to rather than removable from the cab. The trailer of the present invention offers the ability to sort various products for delivery or pickup, to load the goods curbside on either side of the trailer, and to handle heavy objects without significant lifting. A refrigerated trailer may be used for transporting dairy products, meat, or seafood.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A trailer for transporting objects, comprising:
   a trailer frame supported on a plurality of wheels for moving the trailer frame along public roadways having a longitudinal axis spaced between a left-side rear wheel and a right-side rear wheel, the trailer frame having a side opening for access to the transported objects;
   a rotatable carriage within the trailer frame having a carriage axis substantially parallel to the trailer frame longitudinal axis, the carriage rotatable about the carriage axis;
   at least one movable side panel supported on the trailer frame and having a lower closed position extending below the carriage axis to close the opening and an upper open position, the at least one movable side panel when in the upper open position exposing the opening in the trailer frame for access to the transported objects;
   a plurality of storage supports supported on the rotatable carriage for simultaneous rotation about the carriage axis to position a selected storage support adjacent a side of the trailer frame for loading and unloading objects when the at least one side panel is in the open position, each storage support support axis substantially parallel to the trailer frame central axis; and
   a lift mechanism for raising and lowering the rotatable carriage with respect to the trailer frame and thereby the objects supported on the storage supports.

2. A trailer as defined in claim 1, wherein the entirety of the rotatable carriage and the plurality of storage supports are forward of the rear wheels.

3. A trailer as defined in claim 2, further comprising:
   a storage deck above both the left-side and right-side rear wheels.

4. A trailer as defined in claim 1, wherein lower portion of the trailer frame is below the centerline of the rear wheels.

5. A trailer as defined in claim 1, wherein said trailer frame is supported on a trailer chassis and includes a pair of movable side panels on opposing sides of the trailer frame longitudinal axis.

6. A trailer as defined in claim 1, wherein each storage support comprises a pair of spaced apart elongate generally horizontal support members.

7. A trailer as defined in claim 6, wherein each support member includes a pivot for rotating with respect to the rotatable carriage.

8. A trailer for transporting objects along public roadways, comprising:
- a trailer frame having a longitudinal axis spaced between a left-side rear wheel and a right-side rear wheel and defining an interior storage space, the trailer frame having a side orening for access to the transrorted objects;
- a plurality of storage supports supported on the trailer chassis within the storage space, each storage support supporting a plurality of objects thereon, each storage support having a storage support axis substantially parallel to the trailer frame central axis;
- a powered carriage within the storage space for rotatably supporting the plurality of storage supports about a carriage axis substantially parallel with the trailer longitudinal axis to position a selected storage support adjacent a side of the trailer frame for loading and unloading objects, the powered carriage rotatable about the carriage axis;
- at least one movable side panel supported on the trailer frame and having a lower closed position extending below the carriage axis to close the opening and an upper open position, the at least one movable side panel when in the upper open position exposing the opening in the trailer frame for access to the transported objects;
- a rotation control member for automatically stopping rotation of the powered carriage when a selected storage support is adjacent the side of the trailer frame for loading or unloading objects; and
- a lift mechanism for raising and lowering the rotatable carriage with respect to the trailer chassis and thereby the objects supported on the storage supports.

9. A trailer as defined in claim 8, wherein lower portion of the trailer frame is below the centerline for both the left-side and right-side wheels.

10. A trailer as defined in claim 8, wherein each storage support comprises a pair of spaced apart elongate generally horizontal support members.

11. A trailer as defined in claim 10, wherein each support member pivots with respect to the carriage.

12. A trailer as defined in claim 8, wherein the entirety of the carriage and the plurality of storage supports are forward of rear wheels of the trailer and a storage area above both the left-side and right-side rear wheels.

13. A method of transporting objects along public roadways and unloading one or more objects at a delivery site, comprising:
- providing a trailer frame having a longitudinal axis spaced between a left-side rear wheel and a right-side rear wheel, the trailer frame having an opening for access to the transported objects;
- providing a rotatable carriage having a carriage axis substantially parallel to the trailer frame central axis, the carriage rotatable about the carriage axis;
- providing at least one movable side panel supported on the trailer frame and having a lower closed position extending below the carriage axis to close the opening and an upper open position, the at least one movable side panel when in the upper open position exposing the opening in the trailer frame for access to the transported objects;
- storage support axis substantially parallel to the trailer frame central axis;
- loading and unloading objects when the at least one side panel is in the open position; and
- raising or lowering the carriage and thereby the objects supported on the storage supports with respect to the trailer frame.

14. A method as defined in claim 13, further comprising:
- providing a powered rotator for rotating the plurality of supports about the carriage axis; and
- automatically stopping rotation of the powered carriage when a selected storage support is adjacent the side of the trailer frame for loading or unloading objects.

15. A method as defined in claim 13, further comprising:
- rotatably supporting the plurality of storage supports about the carriage axis substantially parallel with the trailer longitudinal axis.

16. A method as defined in claim 13, wherein each storage support is sized to receive a plurality of tires.

* * * * *

UNITED STATES PATENT AND TRADEMARK OFFICE
CERTIFICATE OF CORRECTION

PATENT NO. : 7,588,407 B2 Page 1 of 1
APPLICATION NO. : 11/581919
DATED : September 15, 2009
INVENTOR(S) : Mark Cook It is certified that error appears in the above-identified patent and that said Letters Patent is hereby corrected as shown below:

Column 5:
Line 15, please replace the word "orening" with --opening--.

Column 5:
Line 15, please replace the word "transrorted" with the word --transported--.

Signed and Sealed this

Tenth Day of November, 2009

David J. Kappos
*Director of the United States Patent and Trademark Office*